United States Patent [19]

Okada et al.

[11] Patent Number: 4,619,236

[45] Date of Patent: Oct. 28, 1986

[54] CONTROL APPARATUS OF INTERNAL COMBUSTION ENGINE

[75] Inventors: Tooru Okada, Kameoka; Takanao Yokoyama, Nagaokakyo; Atsushi Ueda; Toshio Iwata, both of Himeji, all of Japan

[73] Assignees: Mitsubishi Jidosha Kogyo Kabushiki Kaisha; Mitsubishi Denki Kabushiki Kaisha, both of Tokyo, Japan

[21] Appl. No.: 655,022

[22] Filed: Sep. 26, 1984

[30] Foreign Application Priority Data

Sep. 30, 1983 [JP] Japan ................................. 58-182502

[51] Int. Cl.[4] .......................... F02P 5/15; F02D 43/00
[52] U.S. Cl. .................................... 123/425; 123/435; 123/564; 123/48 A
[58] Field of Search ............... 123/425, 435, 564, 48 A

[56] References Cited

U.S. PATENT DOCUMENTS 3,822,583  7/1974  Keller et al. ............................ 73/35
4,328,779  5/1982  Hattori et al. ....................... 123/425

FOREIGN PATENT DOCUMENTS 58-143169  8/1983  Japan .................................. 123/425

Primary Examiner—Andrew M. Dolinar
Attorney, Agent, or Firm—Robert E. Burns; Emmanuel J. Lobato; Bruce L. Adams

[57] ABSTRACT

A control apparatus for an internal combustion engine operable on fuels of different octane numbers implements automatic control when the engine knocks to correct the ignition timing preset in accordance with the octane number of the fuel in use to the retarded side so that the engine operates under the optimum condition. This automatic control enhances engine output and drivability, prevents engine fracture and saves fuel cost.

18 Claims, 14 Drawing Figures

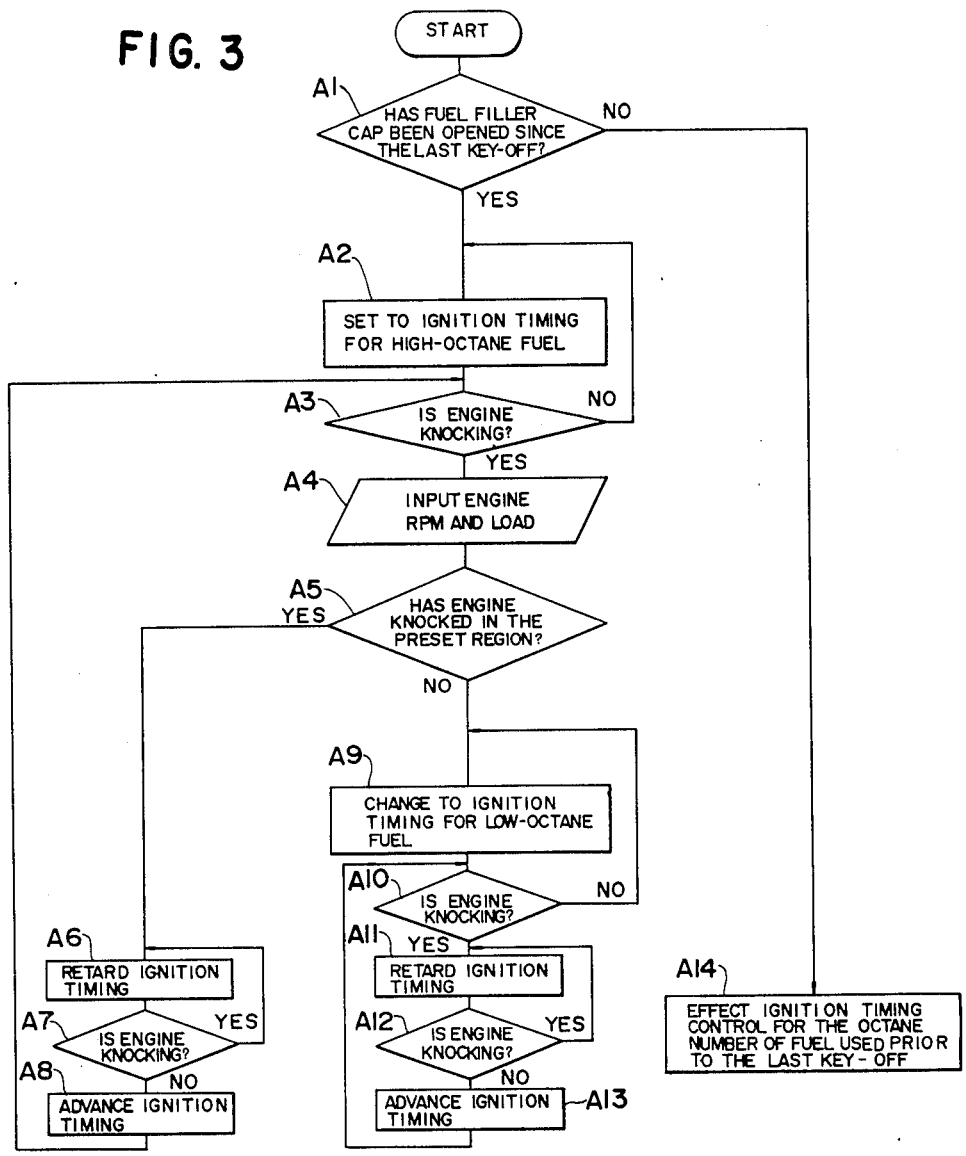

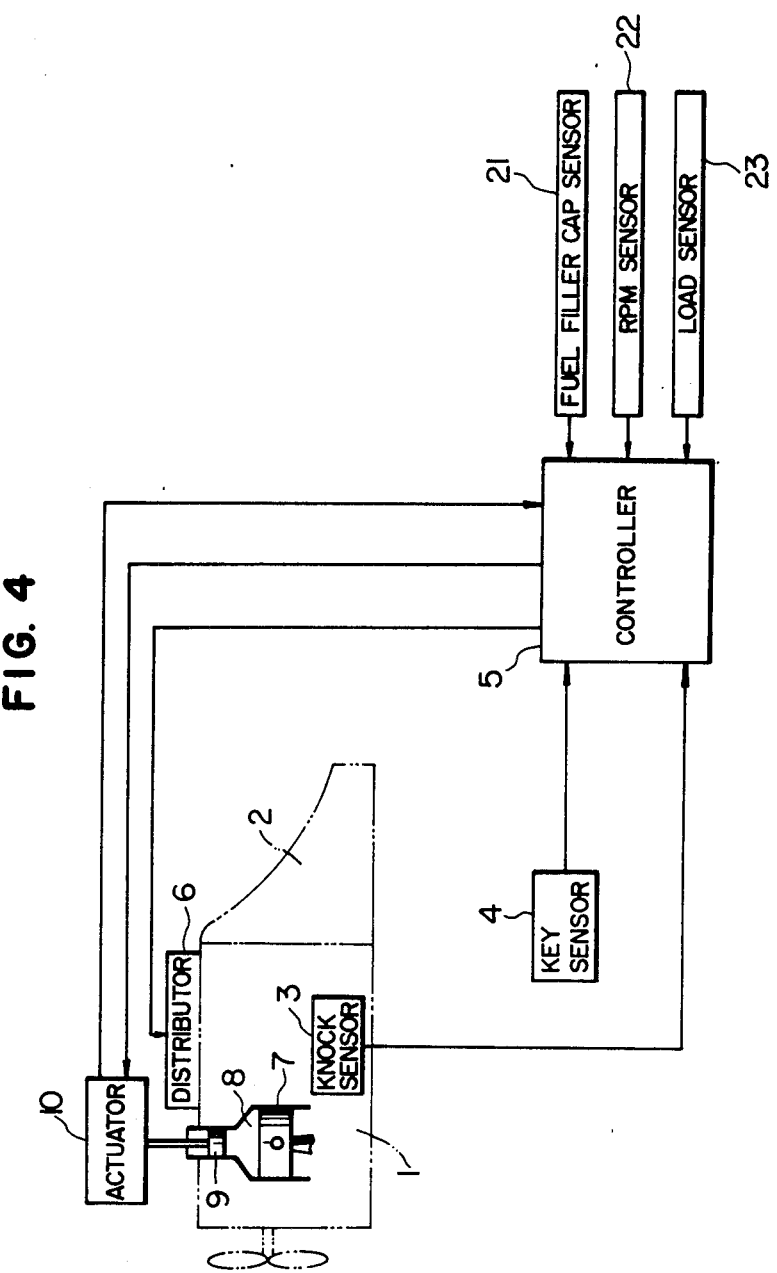

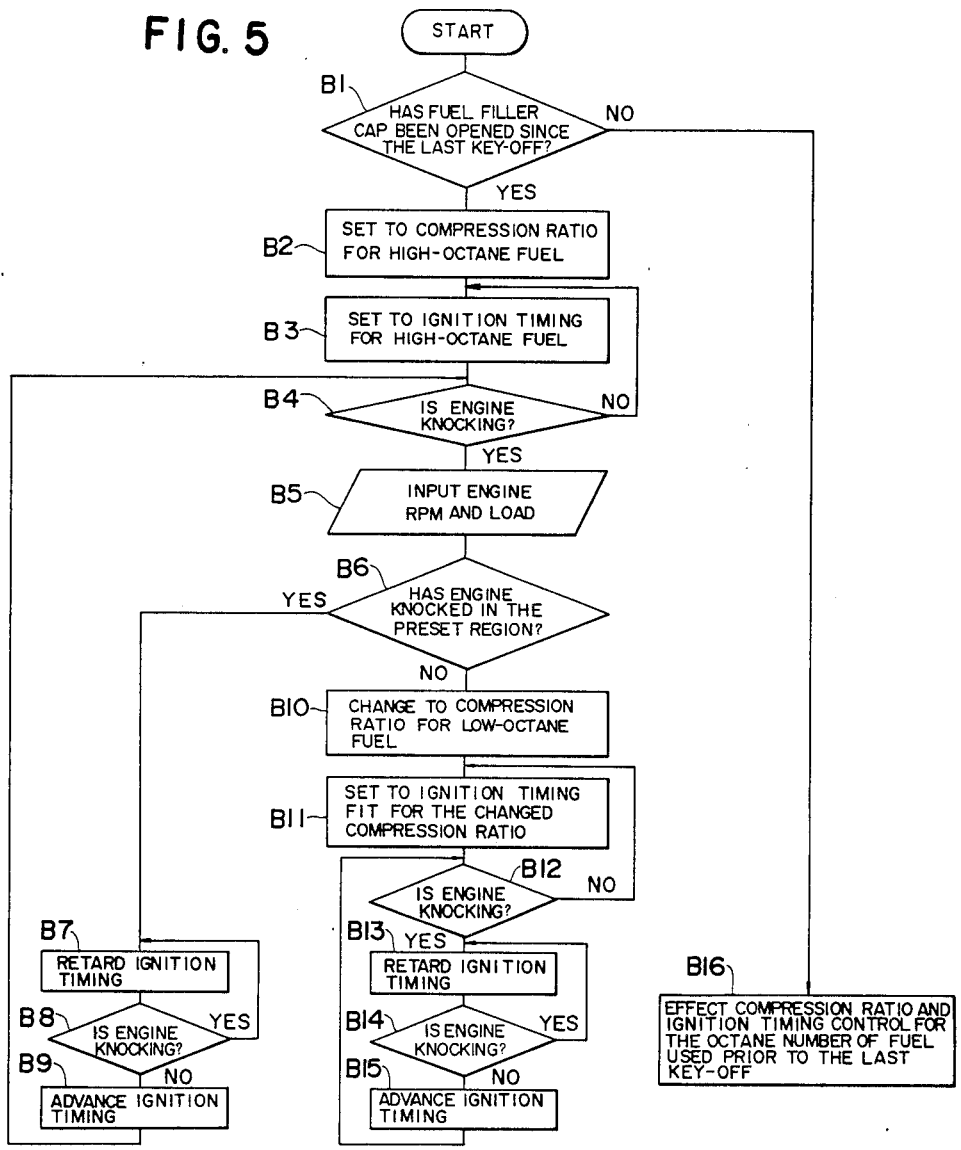

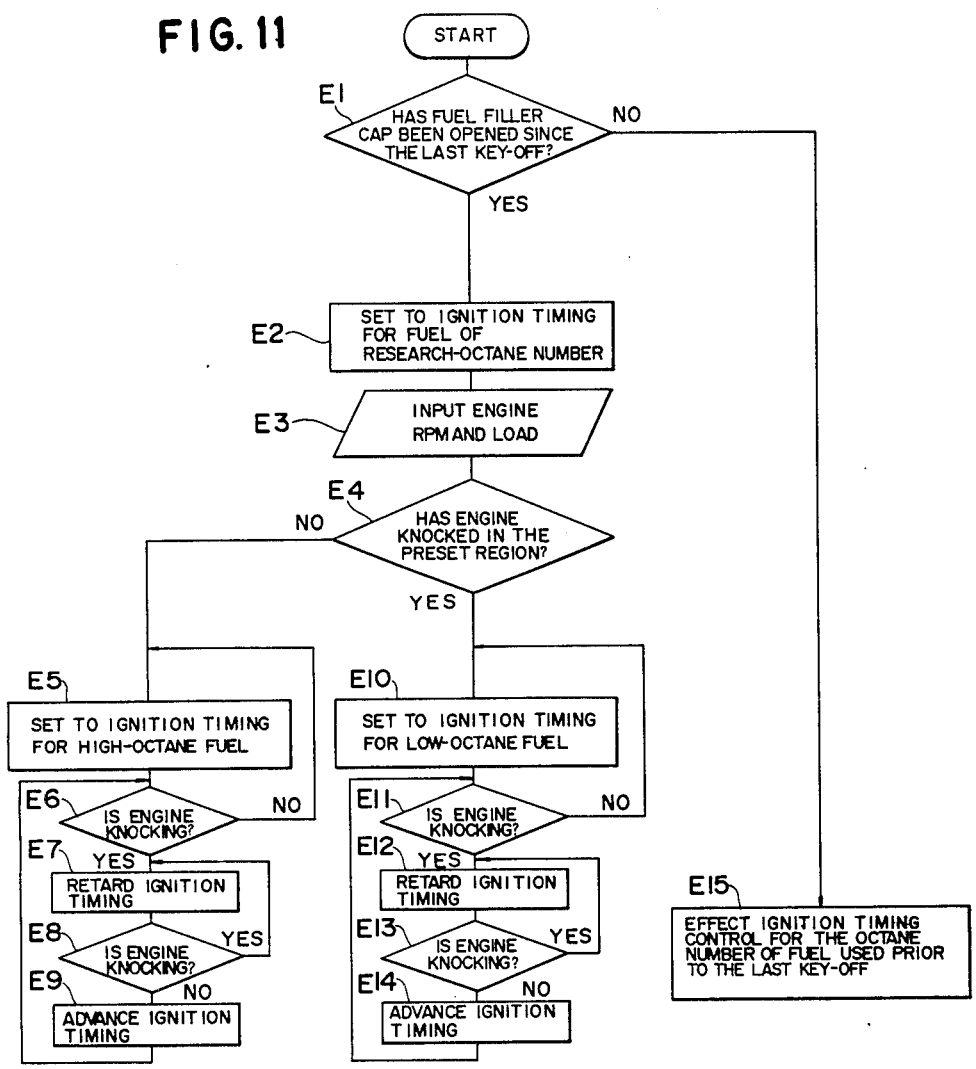

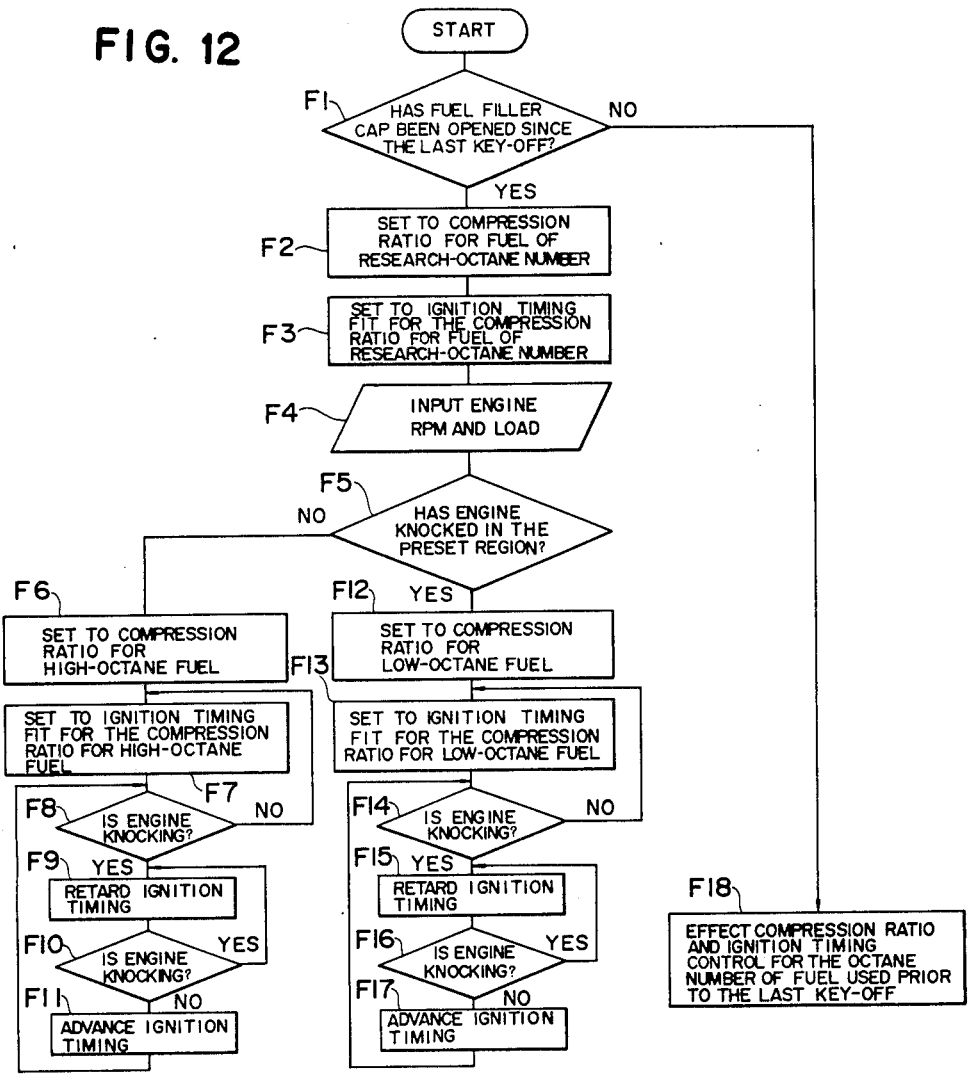

CONTROL APPARATUS OF INTERNAL COMBUSTION ENGINE

BACKGROUND OF THE INVENTION

1. Field of the Invention

This invention relates to a control apparatus of an internal combustion engine operable on fuels of different octane numbers.

2. Description of the Prior Art

In recent years, high-octane unleaded gasoline (octance number=98) has become available in addition to conventional low-octane unleaded gasoline (octane number=91). Under such circumstances, various types of engines that can operate on fuels of different octane numbers have been proposed.

SUMMARY OF THE INVENTION

This invention has been made to enhance the efficiency of such multi-fuel operating engines. The object of this invention is to provide an apparatus for an internal combustion engine that automatically judges the octane number of the fuel in use, automatically sets optimum operating conditions based on the results of the judgement, and causes the engine to operate under such conditions.

In order to achieve this object, a control apparatus for an internal combustion engine of this invention comprises means for sensing the knocking of the engine, means for setting the ignition timing of the engine in accordance with the octane number of the fuel in use based on the output from the knock sensor, means for correcting the ignition timing preset by the ignition timing setter to the retarded side when the occurrence of engine knock has been detected by the knock sensor.

As such, the control apparatus of this invention offers the following effects or benefits.

(1) The control apparatus automatically sets the ignition timing of an engine to the one optimum for the octane number of the fuel in use based on the knocking condition of the engine. When the knocking of the engine is detected, the ignition timing is retarded from the preset point to avoid further knocking. This control enhances the engine output and drivability, prevents engine fracture and saves fuel cost.

(2) This control apparatus can be used with such an engine that uses high-octane and low-octane gasolines whose minimum advances for the best torque or critical antiknock points vary widely. On such occasions, appropriate control can be implemented without causing retard shocks frequently.

BRIEF DESCRIPTION OF THE DRAWINGS

FIGS. 1 to 3 illustrate a first preferred embodiment of this invention. FIG. 1 is a schematic structural view. FIG. 3 is a flowchart showing the sequence of operations.

FIGS. 4 and 5 illustrate a second preferred embodiment of this invention. FIG. 4 is a schematic structural view and FIG. 5 is a flowchart showing the sequence of operations.

FIG. 6 is a schematic structural view and FIG. 7 is a flowchart showing the sequence of operations.

FIG. 8 is a schematic structural view and FIG. 9 is a flowchart showing the sequence of operations.

FIGS. 10 and 11 illustrate a fifth preferred embodiment of this invention. FIG. 10 is a graph illustrating the engine load region of the fifth embodiment and FIG. 11 is a flowchart showing the sequence of operations.

FIG. 12 is a flowchart showing the sequence of operations of a sixth preferred embodiment of this invention.

DETAILED DESCRIPTION OF THE PREFERRED EMBODIMENTS

Figure 1:
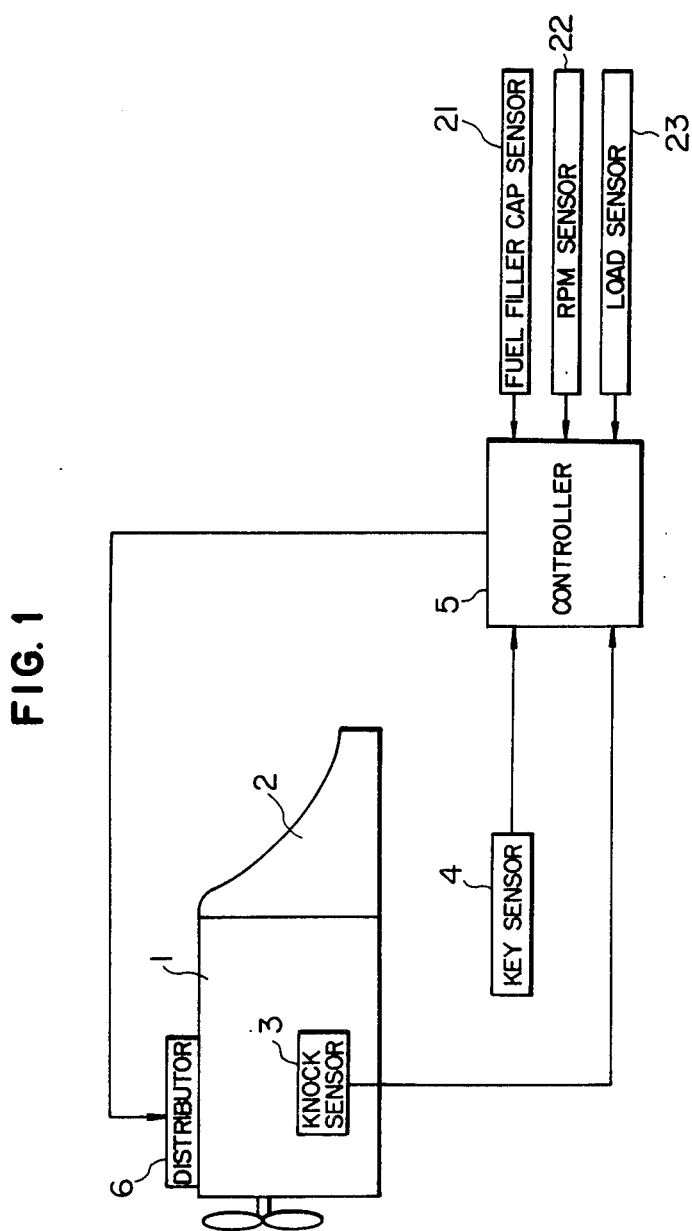

Referring now to the accompanying drawings, preferred embodiments of this invention will be described in detail. Similar reference characters designate similar parts throughout the drawings.

A first preferred embodiment of this invention shown in FIGS. 1 to 3 will be described first.

As shown in FIG. 1, an automotive reciprocating internal combustion engine (hereinafter abbreviated as "engine") 1 is equipped with a knock sensor 3 that detects whether the engine is knocking or not.

The engine is also equipped with a key sensor 4 detecting the on-off condition of the key ignition switch, a fuel filler cap sensor 21 detecting whether the fuel filler cap (not shown) of a fuel tank that supplies fuel to the engine is open or closed, an engine rpm sensor 22 and an engine load sensor 23.

Provision is made so that detection signals from the sensors 3, 4, 21 to 23 are inputted into a controller 5.

Figure 2A:
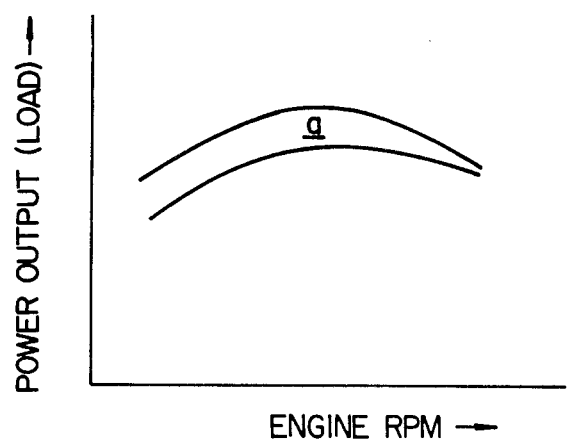
FIGS. 2(a) to 2(c) are graphs illustrating the operation of the embodiment.

The controller 5 is provided with the following means:

(1) high-octane fuel ignition timing information signal generating means that generates an ignition timing information signal fit for the operation on high-octane gasoline in accordance with the rpm and load condition of the engine by computing the amount of retarding (i.e., the amount of retarding from the fixed reference angular position of the crankshaft that is set before the top dead center of the compression stroke) fit for high-octane gasoline based on the data stored in the memory map or other storage;

(2) low-octane fuel ignition timing information signal generating means that generates an ignition timing information signal fit for the operation on low-octane gasoline (regular gasoline) in accordance with the rpm and load condition of the engine by computing the amount of retarding fit for low-octane gasoline based on the data stored in the memory map or other storage;

(3) high-octane fuel ignition timing setting means that sets the ignition timing of the engine on the basis of the output from the high-octane fuel ignition timing information signal generating means;

(4) operating condition checking means that judges, based on the data obtained by the rpm sensor 22 and load sensor 23, whether an engine is operating in a preset load region a [see FIG. 2(a)] in which the engine operating on high-octane gasoline can cause knock at the ignition timing for high-octane gasoline;

(5) fuel distinguishing means that tells that the fuel in use is regular gasoline when the engine operating with the ignition timing for high-octane gasoline knocks in a region other than the aforesaid preset region a;

(6) low-octane fuel ignition timing setting means that sets the ignition timing of the engine on the basis of the output from the low-octane fuel ignition timing information signal generating means when the fuel distinguishing means has judged that the fuel in use is regular gasoline, functioning with priority to the high-octane fuel ignition timing setting means; and (7) knock controlling means that controls the ignition timing to avoid further knocking when the engine knocks.

Figure 2B:
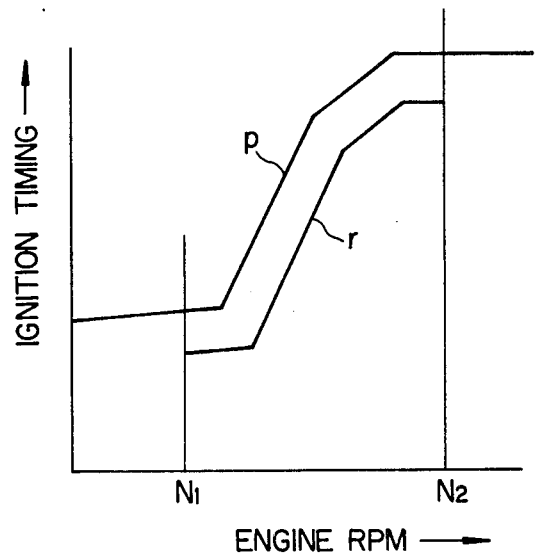

The ignition timing fit for operation on regular gasoline, which is set by the low-octane fuel ignition timing setting means, is the same as the ignition timing for high-octane gasoline in the low to medium engine load regions. In such a specific operating condition as the engine high load region H where knock is likely to occur [see FIG. 2(c)], however, the ignition timing may be retarded by a certain amount, or stepwise depending upon the loading condition, to level r from the ignition timing (or spark advance) p in a given rpm range between $N_1$ and $N_2$, as shown in FIG. 2(b).

With such a setting, adequate minimum advance for the best torque (MBT) can be taken in the low-to-medium engine load regions, with the result that power output is increased and fuel cost is saved while early occurrence of knock in the engine high load region can be avoided surely.

The ignition timing signal fit for high-octane or regular gasoline outputted from the controller 5 is supplied through a distributor 6 to each spark plug.

Reference numeral 2 in FIG. 1 designates a transmission.

Referring now to a flowchart shown in FIG. 3, the operation carried out mainly in the controller 5 will be described.

In step A1, it is judged whether the fuel filler cap has been opened since the key ignition switch was turned off (key-off) last. Such a judgement is made for the following reason. If the fuel filler cap has not been opened, it means that no fuel has been supplied ever since and, therefore, the fuel in use remains unchanged. Then, many other judgements which otherwise should be made can be dispensed with.

If the fuel filler cap has not been opened, then the operation follows the NO route, whereby ignition timing control for the octane number of the fuel used prior to the last key-off, which is stored in the memory of the controller 5, is conducted in step A14.

When the answer in step A1 is YES, the fuel in use may have been changed and the following operation is implemented.

First, the ignition timing is set to the one for high-octane gasoline in step A2.

This setting is accomplished by the high-octane fuel ignition timing information signal generating and setting means in the controller 5.

Then, the engine 1 operates with the ignition timing for high-octane gasoline.

In step A3, whether the engine has knocked or not is judged. If no knock has occurred, then the operations in steps A2 and A3 are repeated. By this means, the engine 1 continues to work with the ignition timing for high-octane gasoline.

If occurrence of knock is found in step A3, the kind of fuel in use is judged. Then, the following operations are implemented so that the ignition timing is changed to the one that is suited for the fuel in use thus identified.

In step A4, engine rpm and load are inputted. In step A5, whether the knock found in step A3 has occurred in the present region a [see FIG. 2(a)] or not is judged. This judgement is made mainly by the operating condition judging means of the controller 5.

As mentioned previously, the preset region a is such that the engine knocks when operating on high-octane gasoline, with the ignition timing set to the one for high-octane gasoline. The preset region a is also chosen so that the engine 1 operating on high-octane gasoline should not knock in other areas. With the same ignition timing, the load region in which the engine operating on high-octane gasoline may knock is limited to a higher zone than that for low-octane gasoline. As such, if the gasoline in use is of regular type, the engine 1 will probably knock in other area before reaching the preset region a.

If, on the other hand, the engine 1 is operating on high-octane gasoline, no knock will be detected until the preset region a is reached.

Accordingly, if it is detected the knock has occurred in the preset region a in step A5, then the fuel distinguishing means judges that the fuel being used is of high-octane type. Then, the operation follows the YES route to implement knock control by means of the knock control means while retaining the ignition timing for high-octane gasoline. The ignition timing is retarded in step A6 and whether or not the engine knocks is judged in step A7. The step A6 and A7 are repeated until the engine no longer knocks. When the engine has ceased to knock, the ignition timing is advanced in step A8.

The occurrence of knock is rechecked in step A3. If no knock is detected, the engine 1 continues to operate with the ignition timing for high-octane gasoline.

If regular gasoline is used, the engine will knock before reaching the preset region a [i.e., in a region lower than the preset region a shown in FIG. 2(a)]. Accordingly, the knocking is detected in step A3, with the subsequent operation done by the operating condition judging means in step A4. In step A5, the operation follows the NO route by means of the fuel distinguishing means.

Then in step A9, the low-octane fuel ignition timing setting means sets the ignition timing of the engine in accordance with the output from the low-octane ignition timing information signal generating means.

After this point, the engine 1 operates with the ignition timing fit for regular gasoline.

In step A10, the occurrence of knock is checked so that the knock control based on the ignition timing for regular gasoline is effected. If knock is detected, the ignition timing is retarded in step A11. Then, the occurrence of knock is rechecked in step A12. The operations in steps A11 and A12 are repeated until the engine stops knocking. When the engine no longer knocks, the ignition timing is advanced in step A13. This ignition timing control is also done mainly by the knock control means of the controller 5.

Following this, the occurrence of knock is rechecked in step A10. If the absence of knock is reassured in step A10, the engine 1 continues to operate with the ignition timing for regular gasoline.

As described above, the control apparatus of this invention automatically tells whether the gasoline in use is high-octane or regular, automatically sets an optimum ignition timing based on the results of such judgement, causes the engine 1 to operate with the ignition timing thus established, and implements knock control (by adjusting the ignition timing) when the engine knocks. These functions permit enhancing the engine power output and drivability, preventing engine fracture, and saving fuel cost.

When used with an engine whose minimum advance for the best torque (MBT) or critical antiknock point for high-octane gasoline differs greatly from those for regular gasoline, appropriate ignition timing control can be implemented without frequently causing retard shocks.

Now a second preferred embodiment of this invention will be described by reference to FIGS. 4 and 5.

With an engine 1, provision is made so that the cubic volume of a cylinder or combustion chamber 8 thereof may be adjusted not only by a piston 7 that rotates the crankshaft but also by a separate sub-piston 9. This adjustment is accomplished by driving the sub-piston 9 by an actuator 10.

The cylinder 8 with variable cubic volume permits changing the compression ratio which is an operating parameter of the engine 1. Namely, the sub-piston 9 and actuator 10 make up a compression ratio varying mechanism.

When operating on regular gasoline, the engine 1 tends to knock unless the compression ratio is lowered below the level for high-octane gasoline. When operating on high-octane gasoline, conversely, the compression ratio can be raised above the level for regular gasoline. That is, the appropriate compression ratio differs between regular and high-octane gasolines. The engine 1 equipped with the sub-piston 9 is capable of adjusting the compression ratio to a level optimum for each different type of gasoline by controlling the amount of motion of the actuator 10.

This control is achieved by means of a controller 5 shown in FIG. 4 which is equipped with the following means:

(1) high-octane fuel compression ratio information signal generating means that generates a compression ratio information signal fit for the operation on high-octane gasoline;

(2) high-octane fuel ignition timing information signal generating means that generates an ignition timing information signal for high-octane gasoline corresponding to the compression ratio information signal generated by the high-octane fuel compression ratio information signal generating means;

(3) high-octane fuel compression ratio setting means that sets the compression ratio of the engine 1 on the basis of the output from the high-octane fuel compression ratio information signal generating means;

(4) high-octane fuel ignition timing setting means that sets the ignition timing of the engine 1 on the basis of the output from the high-octane fuel ignition timing information signal generating means;

(5) low-octane fuel compression ratio information signal generating means that generates a compression ratio information signal fit for the operation on regular gasoline;

(6) low-octane fuel ignition timing information signal generating means that generates an ignition timing information signal for regular gasoline corresponding to the compression ratio information signal generated by the low-octane fuel compression ratio information signal generating means;

(7) fuel distinguishing means that tells that the fuel in use in regular gasoline when the engine operating with the compression ratio and ignition timing for high-octane gasoline knocks in a region other than the aforesaid preset region a;

(8) low-octane fuel compression ratio setting means that sets the compression ratio of the engine on the basis of the output from the low-octane fuel compression ratio information signal generating means when the fuel distinguishing means has judged that the fuel in use is regular gasoline, functioning with priority to the high-octane fuel compression ratio setting means; and (9) low-octane fuel ignition timing setting means that sets the ignition timing of the engine on the basis of the output from the low-octane fuel ignition timing information signal generating means when the fuel distinguishing means has judged that the fuel in use is regular gasoline, functioning with priority to the high-octane fuel ignition timing setting means.

The controller 5 shown in FIG. 4 has the same operating condition checking means and knock controlling means as the controller shown in FIG. 1.

The high-octane fuel compression ratio information signal generating means, the high-octane fuel compression ratio setting means, low-octane fuel compression ratio information signal generating means, fuel distinguishing means and low-octane fuel compression ratio setting means make up a compression ratio controlling means that controls the compression ratio which is an operating parameter of the engine.

Figure 2C:
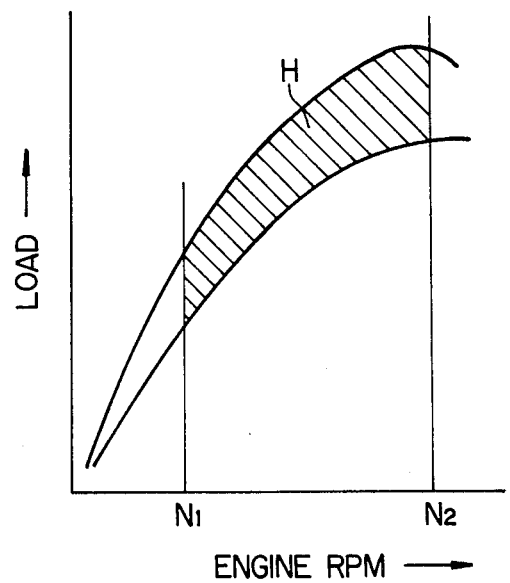

Out of the above-described operating conditions fit for the operation on regular gasoline, compression ratio may be set equal to the one for high-octane gasoline in the low-to-medium engine load region and lower than that in the high engine load region H [see FIG. 2(c)] where knock is likely to occur.

By so doing, higher power output and fuel cost saving can be achieved in the low-to-medium load region while early occurrence of knock in the high load region can be avoided surely.

While the compression ratio controlling signal fit for high-octane or regular gasoline outputted from the controller 5 is supplied to an actuator 10, the ignition timing signal fit for high-octane or regular gasoline outputted from the controller 5 is supplied through a distributor 6 to each spark plug.

Referring now to a flowchart shown in FIG. 5, the operation carried out mainly in the controller 5 in FIG. 4 will be described.

In step B1, it is judged whether the fuel filler cap has been opened since the key ignition switch was turned off (key-off) last. Such a judgement is made for the same reason as that was given in the description of the first preferred embodiment.

If the fuel filler cap has not been opened, then the operation follows the NO route, whereby compression ratio and ignition timing control for the octane number of the fuel used prior to the last key-off is conducted in step B16.

When the answer in step B1 is YES, the fuel in use may have been changed and the following operation is implemented.

In step B2, the high-octane fuel compression ratio information signal generating and compression ratio setting means set the compression ratio of the engine to a level fit for high-octane gasoline by moving the actuator 10 by a given amount. Then in step B3, the high-octane fuel ignition timing information signal generating and ignition timing setting means set the ignition timing of the engine to a level fit for high-octane gasoline.

As a result, the engine 1 operates with the compression ratio and ignition timing for high-octane gasoline.

In step B4, whether or not the engine has knocked is checked. If no knock has occurred, the operations in steps B3 and B4 are repeated, whereby the engine 1 continues to operate with the compression ratio and ignition timing for high-octane gasoline.

If, on the other hand, occurrence of knock is detected in step B4, the following operations are carried out to determine the type of fuel in use and reset the compression ratio and ignition timing to a level fit for the fuel thus determined.

First, engine rpm and load are inputted in step B5. In step B6, whether the knock has occurred in the preset region a [see FIG. 2(a)] or not is judged. This judgement is performed mainly by the operating condition checking means of the controller 5.

If it is established that the knock has occurred in the preset region a, the fuel distinguishing means judges that the fuel being used is high-octane for the same reason as that was given in the description of the first preferred embodiment. Then the operation follows the YES route to carry out the knock control based on the ignition timing for high-octane gasoline by repeating a series of actions in steps B7, B8, B9, B4 and B3 (plus steps B5 and B6).

If the fuel in use is regular gasoline, the engine will knock before the preset region a is reached. Therefore, the occurrence of knock is detected in step B4 and the action in step B5 is taken. Then in step B6, the fuel distinguishing means judges that the fuel in use is of the regular type, with the operation following the NO route.

After that, the low-octane fuel compression ratio information signal generating and compression ratio setting means cause the actuator 10 to move by a given amount in step B10, thereby changing the compression ratio of the engine to a level fit for regular gasoline. Then in step B11, the low-octane fuel ignition timing information signal generating and ignition timing setting means set the ignition timing of the engine to a level fit for regular gasoline and also for the changed compression ratio.

Thus, the engine 1 now operates with the changed compression ratio and ignition timing fit for regular gasoline.

Then, the knock control based on the ignition timing for regular gasoline is continued by repeating the operations in steps B12, B13, B14, B15, B12 and B11.

The amount of operation of the actuator 10 is controlled by the feedback signal from a position sensor attached thereto.

As described above, the second preferred embodiment of this invention automatically tells whether the fuel being used is high-octane or regular, automatically sets optimum compression ratio and ignition timing on the basis of the results of the judgement, and allows the engine 1 to operate with such optimum compression ratio and ignition timing, in addition to offering the effects and benefits analogous to those of the first preferred embodiment described previously. As such, the second preferred embodiment permits saving fuel cost while achieving higher engine power output and ensuring better drivability.

The ability to change not only the compression ratio but also the ignition timing within the knock-free range is conducive to preventing an increase in the exhaust gas temperature.

Figure 6:
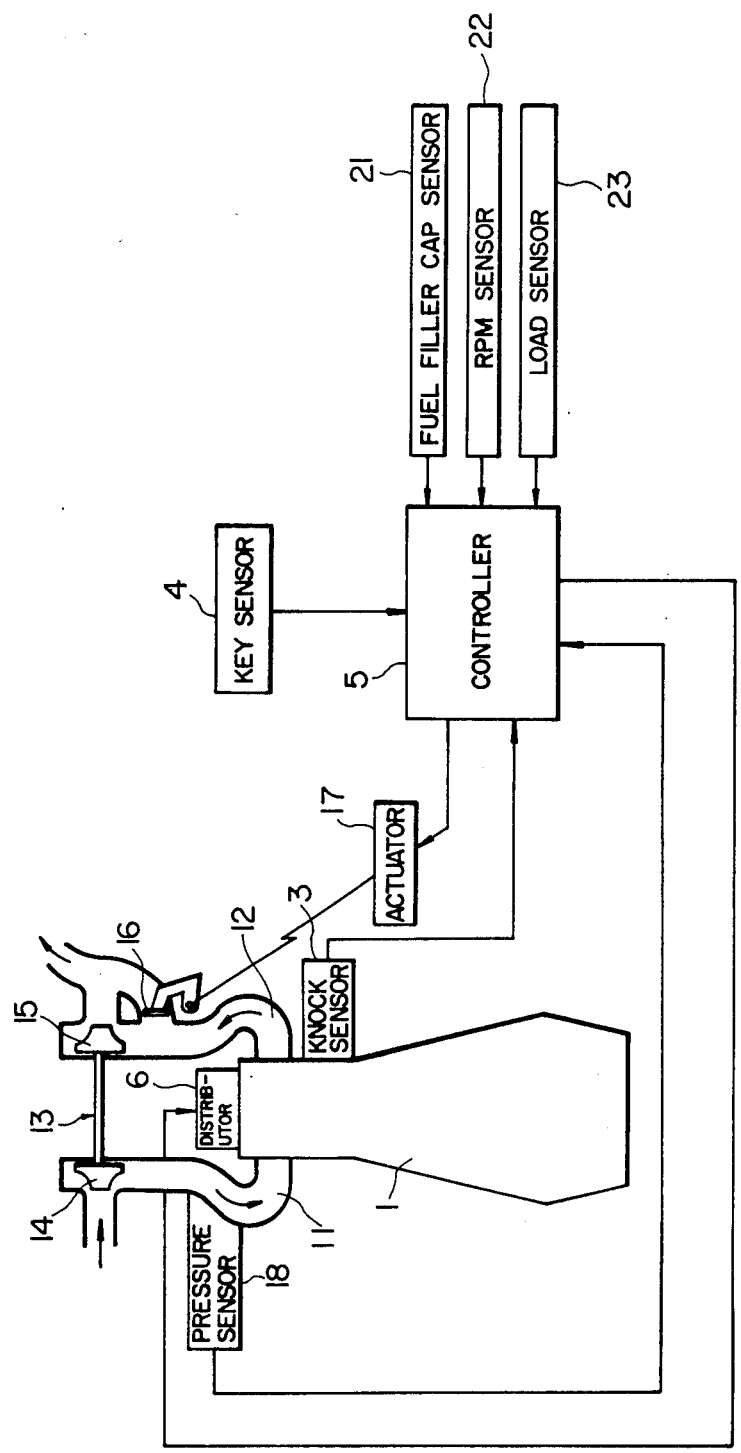
FIGS. 6 and 7 illustrate a third preferred embodiment of this invention.
Figure 7:
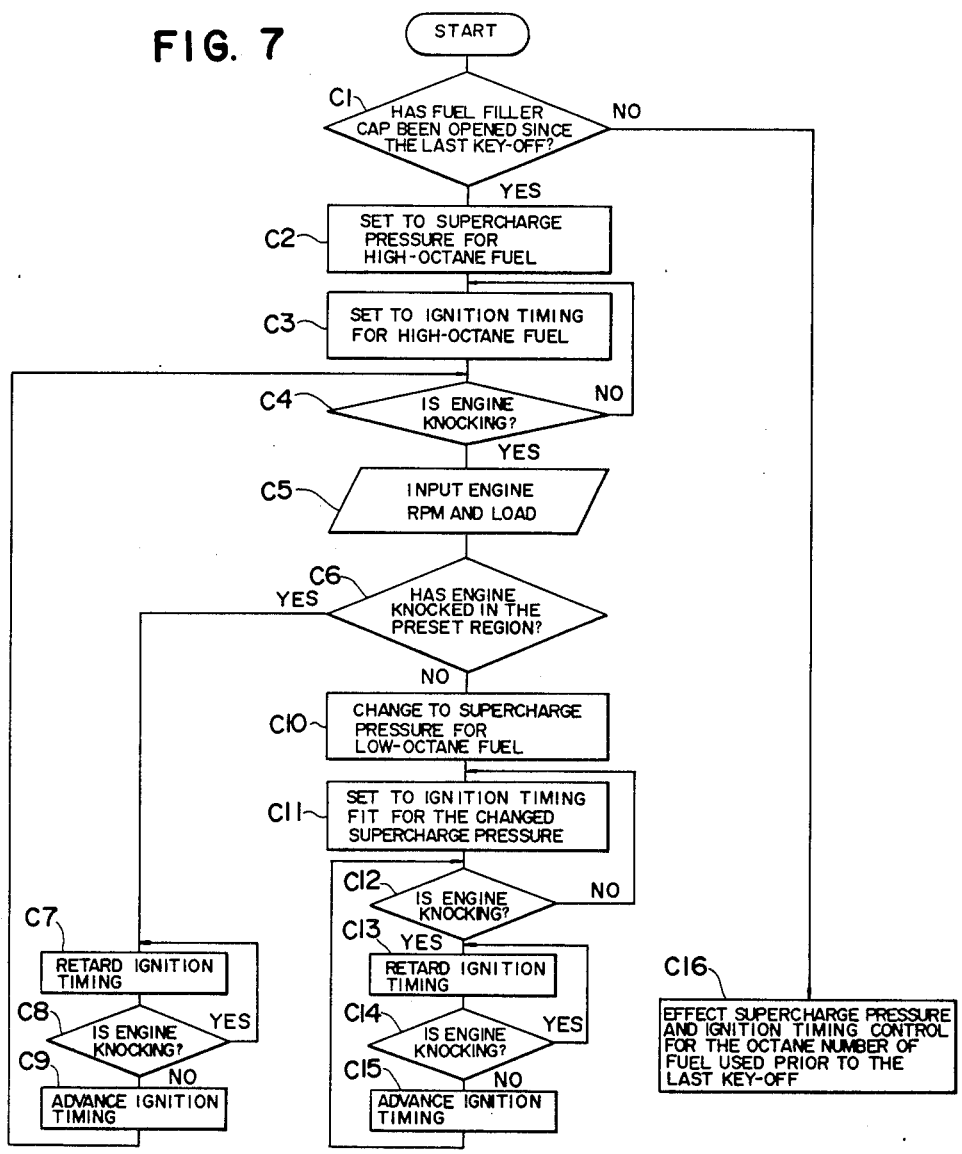

Referring now to FIGS. 6 and 7, a third preferred embodiment of this invention will be described.

An engine 1 is equipped with a turbocharger 13 which, in turn, comprises a turbine 15 provided in the exhaust passage 12 of the engine 1 and a compressor 14 provided in the intake passage 11 of the engine 1.

In the exhaust passage 12 of the engine 1 is also provided a waste gate valve 16 to control supercharged air pressure (or supercharge pressure) that is opened and closed by an actuator 17.

The actuator 17 is, for instance, of the pressure-responding type, with the waste gate valve 16 connected to the diaphragm thereof through a rod. A passage through which the pressurized air in the intake passage is introduced and an atmosphere intake passage having a solenoid valve and an orifice are connected to a pressure chamber separated by the diaphragm. With the solenoid valve closed, the waste gate valve 16 begins to open when the supercharged air pressure exceeds a certain level. When the solenoid valve is open, however, the waste gate valve 16 does not open until the supercharged air pressure reaches a higher level since the pressurized air escapes from the pressure chamber of the actuator 17 to the atmosphere side. This means that the supercharged air pressure can be raised by opening the solenoid valve.

When operating on regular gasoline, the engine 1 is apt to knock unless the maximum supercharged air pressure is lowered below the level for high-octane gasoline. When high-octane gasoline is used, conversely, the maximum supercharged air pressure can be raised above the level suited for regular gasoline. That is, the supercharged air pressure appropriate for regular gasoline differs from that appropriate for high-octane gasoline. With the engine 1 having the turbocharger 13 equipped with the waste gate valve 16, however, the maximum supercharged air pressure can be adjusted to a level optimum for either of the two different types of gasoline by varying the time at which the waste gate valve 16 begins to operate.

This control is achieved by means of a controller 5 shown in FIG. 6 that is equipped with the following means:

(1) high-octane fuel supercharged air pressure information signal generating means that generates a supercharged air pressure information signal fit for the operation on high-octane gasoline;

(2) high-octane fuel ignition timing information signal generating means that generates a high-octane gasoline ignition timing information signal in accordance with the supercharged air pressure information signal generated by the high-octane fuel supercharged air pressure information signal generating means;

(3) low-octane fuel supercharged air pressure information signal generating means that generates a supercharged air pressure information signal fit for the operation on regular gasoline;

(4) low-octane fuel ignition timing information signal generating means that generates a regular gasoline ignition timing information signal in accordance with the supercharged air pressure information signal generated by the low-octane fuel supercharged air pressure information signal generating means;

(5) high-octane fuel supercharged air pressure setting means that sets the supercharged air pressure supplied by the compressor 14 on the basis of the output from the high-octane fuel supercharged air pressure information signal generating means;

(6) high-octane fuel ignition timing setting means that sets the ignition timing of the engine 1 on the basis of the output from the high-octane fuel ignition timing information signal generating means;

(7) fuel distinguishing means that tells that the fuel in use in regular gasoline when the engine operating with the supercharged air pressure and ignition timing for high-octane gasoline knocks in a region other than the aforesaid preset region a;

(8) low-octane fuel supercharged air pressure setting means that sets the supercharged air pressure supplied by the compressor 14 on the basis of the output from the low-octane fuel supercharged air pressure information signal generating means when the fuel distinguishing means has judged that the fuel in use is regular gasoline, functioning with priority to the high-octane fuel supercharged air pressure setting means; and (9) low-octane fuel ignition timing setting means that sets the ignition timing of the engine on the basis of the output from the low-octane fuel ignition timing information signal generating means when the fuel distinguishing means has judged that the fuel in use is regular gasoline, functioning with priority to the high-octane fuel ignition timing setting means.

The controller 5 shown in FIG. 6 has the operating condition checking means and knock controlling means as the controller shown in FIGS. 1 and 4.

While the supercharged air pressure control signal fit for high-octane or regular gasoline outputted by the controller 5 is supplied to the solenoid valve of the actuator 17, the ignition timing signal fit for high-octane or regular gasoline outputted by the controller 5 is supplied to each spark plug by way of a distributor 6.

The waste gate valve 16 and actuator 17 make up supercharged air pressure adjusting means that adjusts the supercharged air pressure applied to the ingoing air-fuel mixture supplied to the engine 1. Meanwhile, the high-octane fuel supercharged air pressure information signal generating means, high-octane fuel supercharged air pressure setting means, low-octane fuel supercharged air pressure information signal generating means, fuel distinguishing means and low-octane fuel supercharged air pressure setting means make up supercharged air pressure controlling means that controls the supercharged air pressure through said supercharged air pressure adjusting means.

The operations effected by the controller 5 shown in FIG. 6 consists of steps C1 to C16 as shown in a flowchart in FIG. 7. The concept of this flowchart is substantially analogous to that shown in FIG. 5 except steps B2, B10, B11 and B16. In other words, the flowchart of FIG. 5 can be changed into that shown in FIG. 7 by replacing "compression ratio" in said steps with "supercharge pressure (supercharged air pressure)" (see steps C2, C10, C11 and C16).

Reference numeral 18 in FIG. 6 designates a sensor to detect the pressure in the intake passage 11.

The third preferred embodiment of this invention thus offers substantially the same effects and benefits as the first and second preferred embodiments previously described.

The ability to change not only the supercharged air pressure but also the ignition timing within the knock-free range is conducive to preventing an increase in the exhaust gas temperature.

Figure 8:
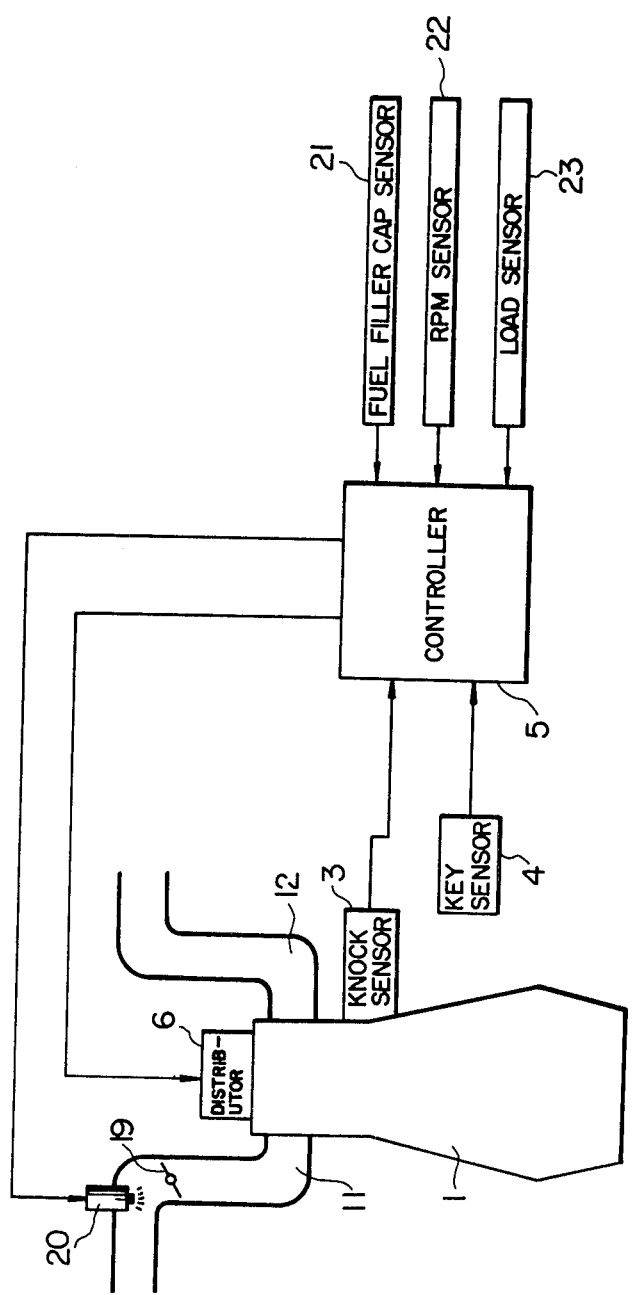
FIGS. 8 and 9 illustrate a fourth preferred embodiment of this invention.
Figure 9:
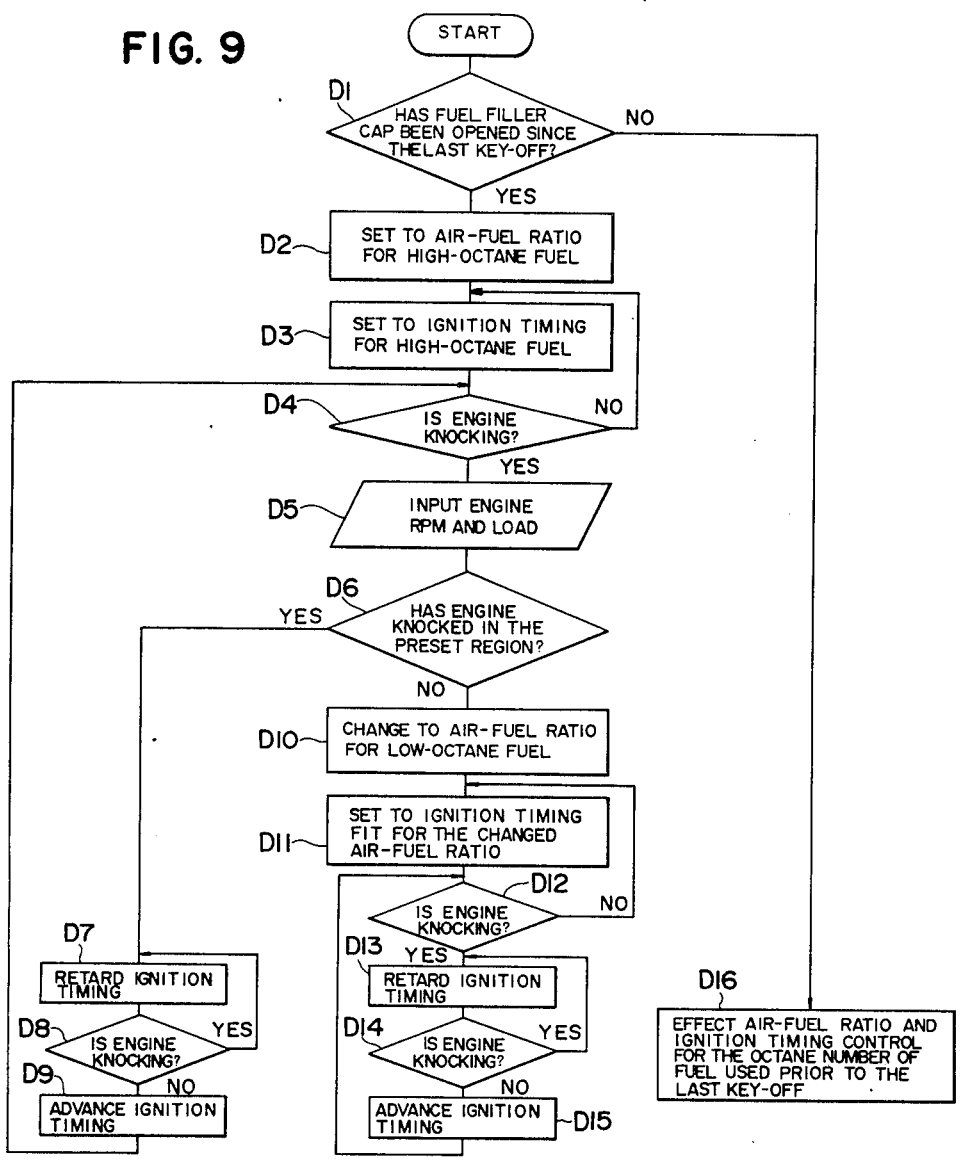

Referring next to FIGS. 8 and 9, a fourth preferred embodiment of this invention will be described.

An engine 1 of this embodiment has a solenoid fuel-injection valve 20 upstream of a throttle valve 19 in an intake passage 11. The fuel-injection valve 20 delivers fuel in accordance with the operating condition of the engine on the basis of the pulse-train signal supplied from a controller 5.

By controlling the signal from the controller 5, the amount of fuel injection and, therefore, the air-fuel ratio can be adjusted.

When operating on regular gasoline, the engine 1 is apt to knock unless the air-fuel ratio is lowered (thereby making the air-fuel mixture richer) below the level for high-octane gasoline. When high-octane gasoline is used, conversely, the air-fuel ratio can be raised (thereby making the air-fuel mixture leaner) above the level suited for regular gasoline. That is, the air-fuel ratio appropriate for regular gasoline differs from that appropriate for high-octane gasoline. With the engine 1 having the solenoid fuel-injection valve 20, however, the air-fuel ratio can be adjusted to a level optimum for either of the two different types of gasoline by controlling the state of the pulse-train signal supplied from the controller 5.

This control is achieved by means of the controller 5 shown in FIG. 8 that is equipped with the following means:

(1) high-octane fuel air-fuel ratio information signal generating means that generates an air-fuel ratio information signal fit for the operation on high-octane gasoline;

(2) high-octane fuel ignition timing information signal generating means that generates a high-octane gasoline ignition timing information signal in accordance with the air-fuel ratio information signal generated by the high-octane fuel air-fuel ratio information signal generating means;

(3) high-octane fuel air-fuel ratio setting means that sets the air-fuel ratio of an air-fuel mixture supplied to the combustion chamber of the engine 1 on the basis of the output from the high-octane fuel air-fuel ratio information signal generating means;

(4) high-octane fuel ignition timing setting means that sets the ignition timing of the engine 1 on the basis of the output from the high-octane fuel ignition timing information signal generating means;

(5) low-octane fuel air-fuel ratio information signal generating means that generates an air-fuel ratio information signal fit for the operation on regular gasoline;

(6) low-octane fuel ignition timing information signal generating means that generates a regular gasoline ignition timing information signal in accordance with the air-fuel ratio information signal generated by the low-octane fuel air-fuel ratio information signal generating means;

(7) fuel distinguishing means that tells that the fuel in use is regular gasoline when the engine operating with the air-fuel ratio and ignition timing for high-octane gasoline knocks in a region other than the aforesaid preset region a;

(8) low-octane fuel air-fuel ratio setting means that sets the air-fuel ratio of the air-fuel mixture supplied to the combustion chamber of the engine on the basis of the output from the low-octane fuel air-fuel ratio information signal generating means when the fuel distinguishing means has judged that the fuel in use is regular gasoline, functioning with priority to the high-octane fuel air-fuel ratio setting means; and (9) low-octane fuel ignition timing setting means that sets the ignition timing of the engine on the basis of the output from the low-octane fuel ignition timing information signal generating means when the fuel distinguishing means has judged that the fuel in use is regular gasoline, functioning with priority to the high-octane fuel ignition timing setting means.

The controller 5 in FIG. 8 has the same operating condition checking means and knock controlling means as the controller shown in FIGS. 1, 4 and 6.

It is also possible to set the air-fuel ratio fit for the operation on regular gasoline equal to the air-fuel ratio for high-octane gasoline in the low-to-medium engine load region and below the air-fuel ratio for high-octane gasoline (thereby making the air-fuel mixture richer) in the high engine load region H [see FIG. 2(c)] where the engine is likely to knock.

By so doing, early occurrence of knock in the high load region can be surely avoided while achieving an enhancement of power output and saving of fuel cost in the low-to-medium load region.

While the air-fuel ratio control signal fit for high-octane or regular gasoline outputted by the controller 5 is supplied to the solenoid fuel-injection valve 20 as described previously, the ignition timing signal fit for high-octane or regular gasoline outputted by the controller 5 is supplied to each spark plug by way of a distributor 6.

In this preferred embodiment, the fuel-injection valve 20 constitutes air-fuel ratio adjusting means that adjusts the air-fuel ratio of the air-fuel mixture supplied to the combustion chamber of the engine 1. Meanwhile, the high-octane fuel air-fuel ratio information signal generating means, high-octane fuel air-fuel ratio setting means, low-octane fuel air-fuel ratio information signal generating means, fuel distinguishing means and low-octane fuel air-fuel ratio setting means make up air-fuel ratio controlling means that controls the air-fuel ratio through said air-fuel ratio adjusting means.

The operations performed by the controller 5 shown in FIG. 8 consists of steps D1 to D16 as shown in a flowchart in FIG. 9. The concept of this flowchart is substantially analogous to that shown in FIGS. 5 and 7 except steps B2, B10, B11 and B16 and C2, C10, C11 and C16. In other words, the flowcharts of FIGS. 5 and 7 can be changed into that shown in FIG. 9 by replacing "compression ratio" and "supercharge pressure" in said steps with "air-fuel ratio" (see steps D2, D10, D11 and D16).

As such, the fourth preferred embodiment of this invention offers substantially the same effects and benefits as the first to third preferred embodiments described previously.

The fourth preferred embodiment is applicable not only to the engine 1 with the solenoid fuel-injection valve 20 but also the engines equipped with a carburetor. In the latter case, the air-fuel ratio is adjusted by varying the amount of air bleed, with the controller 5 supplying a control signal to an air-bleed varying mechanism.

Figure 10:
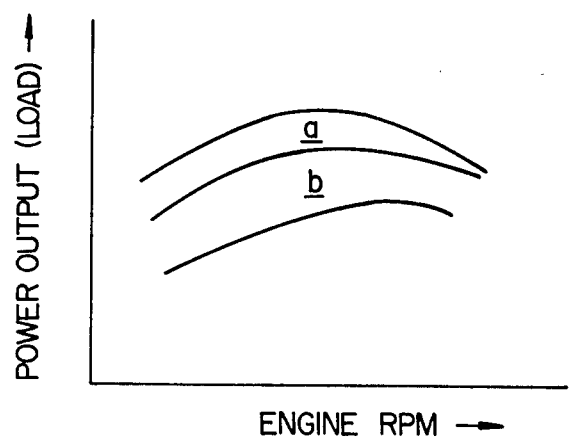

Referring now to FIGS. 10 and 11, a fifth preferred embodiment of this invention will be described.

The structure of the fifth preferred embodiment is analogous to that shown in FIG. 1 except that a controller 5 functions differently.

The controller 5 of the fifth preferred embodiment is equipped with the following means:

(1) high-octane fuel ignition timing information signal generating means that generates an ignition timing information signal fit for the operation on high-octane gasoline in acccordance with the rmp and load condition of the engine by computing the amount of retarding fit for high-octane gasoline based on the data stored in the memory map or other storage;

(2) low-octane fuel ignition timing information signal generating means that generates an ignition timing information signal fit for the operation on low-octane gasoline (regular gasoline) in accordance with the rpm and load condition of the engine by computing the amount of retarding fit for low-octane gasoline based on the data stored in the memory map or other storage;

(3) reference (or research)-octane number fuel ignition timing information signal generating means that generates an ignition timing information signal fit for the operation on fuel having a reference-octane number in accordance with the rpm and load condition of the engine by computing based on the data stored in the memory map or other storage the amount of retarding fit for reference gasoline whose octane number falls midway between the octane numbers of high-octane and regular gasolines;

(4) reference-octane-number fuel ignition timing setting means that sets the ignition timing of the engine on the basis of the output from the reference-octane-number fuel ignition timing information signal generating means;

(5) operating condition checking means that judges, based on the data obtained by the rpm sensor 22 and load sensor 23, whether an engine is operating in a preset load region b (see FIG. 10) in which the engine can knock when operating on regular gasoline but does not knock when operating on high-octane gasoline;

(6) fuel distinguishing means that tells that the fuel in use is regular gasoline when the engine operating with the ignition timing for reference-octane-number gasoline knocks in the preset region b and high-octane gasoline when the engine operating under the same condition does not knock;

(7) Switch control means that chooses either of the high-octane and low-octane fuel ignition timing information signals in accordance with the kind of fuel in use determined by the fuel distinguishing means and sets the ignition timing of the internal combustion engine to that for high-octance gasoline or that for regular gasoline on the basis of the selected ignition timing information signal; and (8) knock controlling means that controls the ignition timing to avoid further knocking when the engine knocks.

The ignition timing fit for operation on regular gasoline, the information signal of which is generated by the low-octane fuel ignition timing information signal generating means, is the same as the ignition timing for high-octane gasoline in the low to medium engine load regions, as with the first preferred embodiment described previously. In the engine high load region H where knock is likely to occur [see FIG. 2(c)], however, the ignition timing may be retarded by a certain amount, or stepwise depending upon the loading condition, to level r from the ignition timing (or spark advance) p for high-octane gasoline, as shown in FIG. 2(b).

With such a setting, adequate minimum advance for the best torque (MBT) can be taken in the low engine load regions, with the result that power output is increased and fuel cost is saved while early occurrence of knock in the engine high load region can be avoided surely.

The ignition timing signal fit for high-octane, regular or reference-octane-number gasoline outputted from the controller 5 is supplied through a distributor 6 to each spark plug.

Referring now to a flowchart shown in FIG. 11, the operation carried out in the controller 5 of the fifth preferred embodiment will be described.

In step E1, it is judged whether the fuel filler cap has been opened since the key ignition switch was turned off (key-off) last. Such a judgement is made for the same reason as was given previously.

If the fuel filler cap has not been opened, then the operation follows the NO route, whereby ignition timing control for the octane number of the fuel used prior to the last key-off is conducted in step E15.

When the answer in step E1 is YES, the fuel in use may have been changed and the following operation is implemented.

First, the ignition timing is set to the one for gasoline with reference-octane number in step E2.

This setting is accomplished mainly by the reference-octane-fuel ignition timing information signal generating means and the reference-octane fuel ignition timing setting means of the controller 5.

Then, the engine 1 operates with the ignition timing for reference-octane-number gasoline.

The engine rpm and load are inputted in step E3, and it is judged whether the knock has occured in the preset region b (see FIG. 10) or not. Such a judgement is accomplished mainly by the operating condition checking means of the controller 5.

As mentioned previously, the preset region b is such that the engine 1 knocks when operating on regular gasoline but does not knock when operating on high-octane gasoline. The load region in which the engine operating on high-octane gasoline may knock is limited to a higher zone than that for regular gasoline. As such, if the gasoline in use is of regular type, the engine 1 will probably knock when the preset region b is reached.

If, on the other hand, the engine 1 is operating on high-octane gasoline, no knock will be detected even when the preset region b is reached.

If the absence of knock in the preset region b is ascertained in step E4, the fuel distinguishing means judges that the fuel in use is high-octane gasoline, with the operation following the NO route. Then in step E5, the switch control means sets the ignition timing of the engine to the one for high-octane gasoline on the basis of the output from the high-octane fuel ignition timing information signal generating means.

Then, the engine 1 operates with the switched ignition timing fit for high-octane gasoline.

After this, knock control is conducted on the basis of the ignition timing for high-octane gasoline. In step E6, it is judged whether the engine has knocked or not. If knock is found, the ignition timing is retarded in step E7. Then, the occurrence of knock is checked again in step E8, and the operations of steps E7 and E8 are repeated until the engine no longer knocks. When no more knock is sensed, the ignition timing is advanced in step E9. Such an ignition timing control is accomplished mainly by the knock control means of the controller 5.

The occurrence of knock is rechecked in step E6. If no knock is detected, the engine 1 continues to operate with the ignition timing for high-octane gasoline.

If regular gasoline is used, the engine will knock in the preset region b. Accordingly, the operation follows the YES route in step E4 in accordance with the data supplied from the fuel distinguishing means.

Then in step E10, the low-octane fuel ignition timing information signal generating means and switch control means set the ignition timing of the engine to the one fit for regular (low-octane) gasoline.

After this point, the engine 1 operates with the ignition timing fit for regular gasoline.

In step E11, the occurrence of knock is checked so that the knock control based on the ignition timing for regular gasoline is effected. If knock is detected, the ignition timing is retarded in step E12. Then, the occurrence of knock is rechecked in step E13. The operations in steps E12 and E13 are repeated until the engine stops knocking. When the engine no longer knocks, the ignition timing is advanced in step E14. This ignition timing control is also done mainly by the knock control means of the controller 5.

Following this, the occurrence of knock is rechecked in step E11. If the absence of knock is ascertained in step E11, the engine 1 continues to operate with the ignition timing for regular gasoline.

The fifth preferred embodiment of this invention assumes reference fuel whose octane number falls midway between the octane numbers of high-octane and regular gasolines. With the engine operated with the ignition timing fit for the reference fuel of such an octane number, it is automatically judged whether the fuel in use is high-octane or regular. Then, the engine 1 is allowed to operate on the optimum ignition timing that is automatically set on the basis of the data thus obtained. When the engine knocks, in addition, knock control (to retard the ignition timing) is implemented instantaneously. Accordingly, this embodiment permits saving fuel cost while increasing engine power output, improving drivability and preventing engine fracture. Furthermore, the fifth preferred embodiment causes much less retard shock than the other embodiments previously described.

Referring finally to FIG. 12, a sixth preferred embodiment of this invention will be described.

The structure of the sixth preferred embodiment is analogous to that which is shown in FIG. 4 except that a controller 5 functions differently.

The controller 5 of the sixth preferred embodiment is equipped with the following means:

(1) high-octane fuel compression ratio information signal generating means that generates a compression ratio information signal fit for the operation on high-octane gasoline;

(2) high-octane fuel ignition timing information signal generating means that genertes an ignition timing information signal for high-octane gasoline corresponding to the compression ratio information signal generated by the high-octane fuel compression ratio information signal generating means;

(3) low-octane fuel compression ratio information signal generating means that generates a compression ratio information signal fit for the operation on regular gasoline;

(4) low-octane fuel ignition timing information signal generating means that generates an ignition timing information signal for regular gasoline corresponding to the compression ratio information signal generated by the low-octane fuel compression ratio information signal generating means;

(5) reference (or research)-octane-number fuel compression ratio information signal generating means that generates a compression ratio information signal fit for the operation on reference fuel whose octane number falls midway between the octane numbers of high-octane and regular gasolines;

(6) reference-octane-number fuel ignition timing information signal generating means that generates an ignition timing information signal corresponding to the compression ratio information signal generated by the reference-octane-number fuel compression ratio information signal generating means;

(7) reference-octane-number fuel compression ratio setting means that sets the compression ratio of the engine 1 on the basis of the output from the reference-octane-number fuel compression ratio information signal generating means;

(8) reference-octane-number fuel ignition timing setting means that sets the ignition timing of the engine 1 on the basis of the output from the reference-octane-number fuel ignition timing information signal generating means;

(9) operating condition checking means that judges, based on the data obtained by the rpm sensor 22 and load sensor 23, whether an engine is operating in a preset load region b (see FIG. 10) in which the engine can knock when operating on regular gasoline but does not knock when operating on high-octane gasoline;

(10) fuel distinguishing means that tells that the fuel in use is regular gasoline when the engine operating with the compression ratio and ignition timing for reference-octane-number gasoline knocks in the preset region b and high-octane gasoline when the engine operating under the same condition does not knock in the preset region b;

(11) compression ratio switch control means that chooses either of the high-octane and low-octane fuel compression ratio information signals in accordance with the kind of fuel in use determined by the fuel distinguishing means and sets the compression ratio of the combustion chamber to that for high-octane gasoline or that for regular gasoline on the basis of the selected compression ratio information signal;

(12) ignition timing switch control means that chooses either of the high-octane and low-octane fuel ignition timing information signals in accordance with the kind of fuel in use determined by the fuel distinguishing means and sets the ignition timing of the internal combustion engine to that for high-octane gasoline or that for regular gasoline on the basis of the selected ignition timing information signal; and

(13) knock controlling means that controls the ignition timing to avoid further knocking when the engine knocks.

Out of the above-described operating conditions fit for the operation on regular gasoline, compression ratio may be set, as with the second preferred embodiment described before, equal to the one for high-octane gasoline in the low-to-medium engine load region and lower than that in the high engine load region H [see FIG. 2(c)] where knock is likely to occur.

By so doing, higher power output and fuel cost saving can be achieved in the low-to-medium load region while early occurrence of knock in the high load region can be avoided surely.

While the compression ratio controlling signal fit for high-octane or regular gasoline outputted from the controller 5 is supplied to an actuator 10 shown in FIG. 4, the ignition timing signal fit for high-octane or regular gasoline outputted from the controller 5 is supplied through a distributor 6 to each spark plug.

Referring now to a flowchart shown in FIG. 12, the operation carried out mainly in the controller 5 of the sixth preferred embodiment will be described.

In step F1, it is judged whether the fuel filler cap has been opened since the key ignition switch was turned off (key-off) last. Such a judgement is made for the same reason as that was given previously.

If the fuel filler cap has not been opened, then the operation follows the NO route, whereby compression ratio and ignition timing control for the octane number of the fuel used prior to the last key-off is conducted in step F18.

When the answer in step F1 is YES, the fuel in use may have been changed and the following operation is implemented.

In step F2, the compression ratio of the engine is set to a level fit for reference-octane-number gasoline by moving the actuator 10 by a given amount. Then in step F3, the ignition timing of the engine is set to a level fit for reference-octane-number gasoline.

This operation is accomplished mainly by the reference-octane-number fuel compression ratio information signal generating means, the reference-octane-number fuel compression ratio setting means, the reference-octane-number fuel ignition timing information signal generating means and the reference-octane-number fuel ignition timing setting means of the controller 5.

As a result, the engine 1 operates with the compression ratio and ignition timing for fuel with the reference octane number.

Then, engine rpm and load are inputted in step F4. In step F5, whether the knock has occurred in the preset region b (see FIG. 10) or not is judged. This judgement is performed mainly by the operating condition checking means of the controller 5.

When it is found in step F5 that no knock has occurred in the preset region b, the fuel in use is judged to be high-octane for the same reason as that was given in the description of the fifth preferred embodiment, with the operation following the NO route. Then in steps F6 and F7, the compression ratio and ignition timing of the engine are set to a level fit for high-octane gasoline.

The series of operations just described is performed mainly by the operating condition checking means, fuel distinguishing means, high-octane fuel compression ratio and ignition timing information signal generating means, compression ratio and ignition timing switch control means of the controller 5.

Thus, the engine 1 now operates with the changed ignition timing fit for high-octane gasoline.

Then, the knock control based on the ignition timing for high-octane gasoline is continued by repeating the operations in steps F8, F9, F10, F11, F8 and F7.

When regular gasoline is used, on the other hand, engine knock occurs in the preset region b, so that the operation follows the YES route in step F5.

Then, the compression ratio and ignition timing of the engine are set to the levels fit for regular gasoline in steps F12 and F13.

The series of operations just described is performed mainly by the operating condition checking means, fuel distinguishing means, low-octane fuel compression ratio and ignition timing information signal generating means, compression ratio and ignition timing switch control means of the controller 5.

Thus, the engine 1 now operates with the changed compression ratio and ignition timing fit for high-octane gasoline.

Then, the knock control based on the ignition timing for regular gasoline is continued by repeating the operations in steps F14, F15, F16, F17, F14 and F13.

As such, the sixth preferred embodiment of this invention offers substantially the same effects and benefits as the fifth embodiment described before.

The function of an engine that is capable of changing the supercharged air pressure or air-fuel ratio depending upon the kind of fuel used can be also explained by only moderately modifying the flowchart of the sixth preferred embodiment (see FIG. 12). That is, the flowchart shown in FIG. 12 can be used by replacing "compression ratio" in steps F2, F6, F7, F12, F13 and F18 with "supercharge pressure (supercharged air pressure)" or "air-fuel ratio."

The structure of an engine that is capable of changing supercharged air pressure is analogous to that shown in FIG. 6, while the structure of an engine capable of changing air-fuel ratio is similar to that shown in FIG. 8.

In the fifth and sixth preferred embodiments, the engine operating conditions (i.e., ignition timing, compression ratio, supercharged air pressure and air-fuel ratio) may be set to those for high-octane gasoline at the outset. In other words, it is permissible to set the ignition timing of the engine to that for high-octane fuel in steps E2 and F3, and the compression ratio to that for high-octane fuel in step F2. In this case, step F6 can be omitted.

In the second, third, fourth and sixth preferred embodiments, ignition timing and one of other parameters, i.e., compression ratio, supercharged air pressure and air-fuel ratio, are controlled. But it is also possible to control two or more of the latter parameters together with ignition timing.

Provision may be also made to show the kind of fuel determined on an indicator within the passenger room.

What is claimed is:

1. A control apparatus for an internal combustion engine comprising a base ignition timing information generating means for generating a plurality of base advance informations according to octane number of fuel being used in said internal combustion engine, a knock detecting means for detecting a knocking condition of said internal combustion engine, an operating condition detecting means for detecting an operating condition of said internal combustion engine, a fuel distinguishing means for determining said fuel being used in said internal combustion engine on the basis of detection results by said knock detecting means and detection results by said operating condition detecting means, a base ignition timing setting means adapted to be operated on the basis of detection results by said fuel distinguishing means to obtain base ignition timing information in accordance with octane number of fuel determined by said fuel distinguishing means from base ignition timing informations by said base ignition timing information generating means, thereby setting the base ignition timing of said internal combustion engine according to information obtained, and a knock control means for retarding said ignition timing set by said base ignition timing setting means on the basis of an output from said knock detecting means when said internal combustion engine knocks, thereby suppressing generation of knocking.

2. The control apparatus as defined in claim 1, wherein said base ignition timing information generating means comprises high-octane fuel ignition timing information generating means for generating ignition timing information fit for high-octane fuel and a low-octane fuel ignition timing information generating means for generating ignition timing information fit for low-octane fuel, information generated by said low-octane fuel ignition timing information generating means being retarded as compared with information generated by said high-octane fuel ignition timing information generating means, and said base ignition timing setting means comprises a high-octane fuel ignition timing setting means for setting ignition timing of said internal combustion engine on the basis of said high-octane fuel ignition timing information generating means and a low-octane fuel ignition timing setting means for setting ignition timing of said internal combustion engine on the basis of said low-octane fuel ignition timing information generating means when said fuel distinguishing means has determined that the fuel being used is low-octane fuel, thereby setting ignition timing of said internal combustion engine on the basis of said low-octane fuel ignition timing information generating means.

3. The control apparatus as defined in claim 2, wherein said operating condition detecting means is adapted to detect whether or not said operating condition of said internal combustion engine is a preset operating condition, and said fuel distinguishing means is adapted to determine that the fuel being used is the low-octane fuel under such a condition where said high-octane fuel ignition timing setting means is carrying out setting of ignition timing of said internal combustion engine by said high-octane fuel ignition timing information generating means when said knock detecting means has detected knocking of said internal combustion engine and said operating condition detecting means has detected that the operating condition of said internal combustion engine upon detection of the knocking is out of said preset operating condition.

4. A control apparatus for an internal combustion engine according to claim 3, in which said preset operating condition is such that the internal combustion engine can knock if the engine is operated on high-octane fuel when the ignition timing of the engine has been set on the basis of the output from said high-octane fuel ignition timing information signal generating means.

5. A control apparatus for an internal combustion engine according to claim 4, in which said operating condition detecting means comprises load detecting means that senses the condition of the load under which the internal combustion engine operates, said preset operating condition of the internal combustion engine being high-load operation.

6. The control apparatus as defined in claim 1, wherein said base ignition timing information generating means comprises a high-octane fuel ignition timing information generating means for generating ignition timing information fit for high-octane fuel and a low-octane fuel fuel ignition timing information generating means for generating ignition timing information fit for low-octane fuel, information generated by said low-octane fuel ignition timing information generating means being retarded as compared with information generated by said high-octane fuel ignition timing information generating means, and said base ignition timing setting means comprises a selecting means for selecting either said high-octane fuel ignition timing information generating means or said low-octane fuel ignition timing information generating means according to decision result by said fuel distinguishing means and setting ignition timing of said internal combustion engine on the basis of said ignition timing information generating means as selected.

7. The control apparatus as defined in claim 6, wherein said fuel distinguishing means is adapted to determine the fuel being used in said internal combustion engine on the basis of said knocking condition to be detected by said knock detecting means when the operating condition of said internal combustion engine is detected to be the preset operating condition by said operating condition detecting means.

8. A control apparatus for an internal combustion engine according to claim 7, in which said preset operating condition is such that the internal combustion engine knocks when operating on low-octane fuel but does not knock when operating on high-octane fuel, said fuel distinguishing means being adapted to judge that the fuel being used is low-octane if a knock of the internal combustion engine is found by said knock detecting means under said preset operating condition and high-octane if no knock is found under said preset operating condition and said switch control means setting the ignition timing of the internal combustion engine to a level fit for the fuel being used in accordance with the results of the judgement made by said fuel distinguishing means.

9. A control apparatus for an internal combustion engine according to claim 8, in which said operating condition detecting means comprises load detecting means that senses the condition of the load under which the internal combustion engine operates, said preset operating condition of the internal combustion engine being medium-load operation.

10. A control apparatus for an internal combustion engine according to claim 1, which further comprises parameter controlling means that controls operating parameters other than ignition timing on the basis of the output from said knock detecting means.

11. A control apparatus for an internal combustion engine according to claim 10, in which the internal combustion engine comprises a compression ratio varying mechanism that changes the cubic volume of the combustion chamber of the internal combustion engine and said parameter controlling means comprises compression ratio controlling means that controls the compression ratio of the internal combustion engine by acting on said compression ratio varying mechanism.

12. A control apparatus for an internal combustion engine according to claim 10, in which the internal combustion engine comprises a supercharger provided in the intake passage and said parameter controlling means comprises supercharged air pressure controlling means that controls the supercharged air pressure applied by said supercharger.

13. A control apparatus for an internal combustion engine according to claim 10, in which said parameter controlling means comprises air-fuel ratio controlling means that controls the air-fuel ratio of the air-fuel mixture supplied to the internal combustion engine.

14. The control apparatus as defined in claim 1, further comprising a detection means for detecting whether or not the fuel being used in said internal combustion engine is supplemented, wherein said base ignition timing setting means is adapted to be operated on the basis of decision result by said fuel distinguishing means when it is detected that the fuel being used has been supplemented.

15. A control apparatus for an internal combustion engine according to claim 14, in which fuel is supplied to said engine from a fuel container having a cap and in which said means detecting whether the fuel being used has been supplemented comprises means for detecting whether the cap of the fuel container of the internal combustion engine is open or closed.

16. The control apparatus as defined in claim 1, wherein said base ignition timing setting means is adapted to set the base ignition timing of said internal combustion engine under a specific operating condition according to the octane number of the fuel being used on the basis of decision result by said operating condition detecting means.

17. A control apparatus for an internal combustion engine according to claim 16, in which said operating condition detecting means comprises load detecting means that senses the loaded condition of the internal combustion engine, the specific operating condition of the engine being set to high-load operation.

18. A control apparatus for an internal combustion engine according to claim 16, in which said operating condition detecting means comprises load detecting means that senses the loaded condition of the internal combustion engine and rpm detecting means that determines the number of rotations of the internal combustion engine, the specific operating condition of the engine being set to medium-speed high-load operation.

* * * * *